United States Patent
Sun et al.

(10) Patent No.: US 10,813,114 B2
(45) Date of Patent: Oct. 20, 2020

(54) TIMING METHOD FOR TIME DIVISION DUPLEX COMMUNICATION, BASE STATION, AND USER EQUIPMENT

(71) Applicant: HUAWEI TECHNOLOGIES CO., LTD., Shenzhen, Guangdong (CN)

(72) Inventors: Hao Sun, Beijing (CN); Yan Cheng, Beijing (CN); Lixia Xue, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/185,307

(22) Filed: Nov. 9, 2018

(65) Prior Publication Data
US 2019/0098652 A1   Mar. 28, 2019

Related U.S. Application Data

(63) Continuation of application No. PCT/CN2016/081684, filed on May 11, 2016.

(51) Int. Cl.
*H04W 4/00* (2018.01)
*H04W 72/12* (2009.01)
(Continued)

(52) U.S. Cl.
CPC .......... *H04W 72/1263* (2013.01); *H04L 1/00* (2013.01); *H04L 1/1854* (2013.01);
(Continued)

(58) Field of Classification Search
CPC .......... H04W 72/1263; H04W 72/042; H04W 72/1205; H04W 72/0446; H04W 72/1289;
(Continued)

(56) References Cited

U.S. PATENT DOCUMENTS

2015/0358115 A1   12/2015  Wang et al.
2016/0270070 A1*   9/2016  Mukkavilli ....... H04W 72/0446
(Continued)

FOREIGN PATENT DOCUMENTS

CN   1917420 A    2/2007
CN   102740462 A   10/2012
(Continued)

OTHER PUBLICATIONS

International Search Report dated Jan. 24, 2017 in corresponding International Patent Application No. PCT/CN2016/081684.
(Continued)

*Primary Examiner* — Abdelnabi O Musa
(74) *Attorney, Agent, or Firm* — Womble Bond Dickinson (US) LLP

(57) ABSTRACT

A timing method for time division duplex communication, an uplink/downlink data scheduling method, a base station, and user equipment are provided. By determining whether grouping needs to be performed on uplink/downlink short transmission time intervals, it is determined, for different grouping requirements, whether addition of indication information to control signaling is required to indicate to user equipment an uplink short transmission time interval sequence number in an uplink short transmission time interval group for uplink data transmission or feedback to downlink data scheduling. Alternatively, addition of indication information to control signaling is not required, and uplink data transmission or feedback to downlink data scheduling is performed in an uplink short transmission time interval determined according to a default rule.

11 Claims, 14 Drawing Sheets

(51) Int. Cl.
*H04L 5/00* (2006.01)
*H04L 1/00* (2006.01)
*H04L 1/18* (2006.01)
*H04W 72/04* (2009.01)
*H04L 5/14* (2006.01)

(52) U.S. Cl.
CPC .......... *H04L 1/1887* (2013.01); *H04L 5/0053* (2013.01); *H04L 5/0092* (2013.01); *H04L 5/0094* (2013.01); *H04W 72/042* (2013.01); *H04W 72/1205* (2013.01); *H04L 5/0044* (2013.01); *H04L 5/1469* (2013.01); *H04W 72/0446* (2013.01); *H04W 72/1289* (2013.01)

(58) Field of Classification Search
CPC ....... H04L 1/00; H04L 1/1854; H04L 5/0053; H04L 5/0044; H04L 5/0094
See application file for complete search history.

(56) References Cited

U.S. PATENT DOCUMENTS

| | | | |
|---|---|---|---|
| 2018/0041325 A1 | 2/2018 | Lee et al. | |
| 2018/0294942 A1* | 10/2018 | Byun | ........................ H04L 5/14 |
| 2018/0359762 A1* | 12/2018 | Xiong | .................. H04B 7/2656 |
| 2019/0044675 A1* | 2/2019 | Li | ........................ H04J 11/0076 |

FOREIGN PATENT DOCUMENTS

| | | |
|---|---|---|
| CN | 104938004 A | 9/2015 |
| WO | 2014060010 A1 | 4/2014 |
| WO | 2016040290 A1 | 3/2016 |
| WO | 2016064039 A1 | 4/2016 |

OTHER PUBLICATIONS

R1-162822, 3GPP TSG-RAN WG1 Meeting #84bis, Nokia, Alcatel-Lucent Shanghai Bell, "Considerations on shorter TTI for TDD duplex mode" Busan, Korea, Apr. 11-15, 2016. XP051079705. 5 pages.
R2-154296, 3GPP TSG RAN WG2 Meeting #91, Intel Corporation, "Protocol Impact of TTI reduction" Malmo, Sweden, Oct. 5-9, 2015. XP051040273. 5 pages.
R1-156819, 3GPP TSG RAN WG1 Meeing #83, Samsung, "Study on specification impact for downlink due to TTI shortening" Anaheim, USA, Nov. 15-22, 2015. XP051003179. 5 pages.
Extended European Search Report dated Apr. 2, 2019 in corresponding European Patent Application No. 16901255.6 (9 pages).
International Search Report dated May 11, 2016 issued in Chinese Application No. PCT/CN2016/081684 (11 pages).

* cited by examiner

| Uplink-downlink configuration | Downlink-to-uplink switch-point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

TIMING METHOD FOR TIME DIVISION DUPLEX COMMUNICATION, BASE STATION, AND USER EQUIPMENT

CROSS-REFERENCE TO RELATED APPLICATIONS

This application is a continuation of International Application No. PCT/CN2016/081684, filed on May 11, 2016, the disclosure of which is hereby incorporated by reference in its entirety.

TECHNICAL FIELD

The present invention relates to the field of communications technologies, and in particular, to a timing method for time division duplex communication, a base station, and user equipment.

BACKGROUND

In an existing time division duplex-long term evolution (TDD-LTE) system, a radio frame is 10 ms in duration, and is divided into 10 1-ms subframes. Each subframe includes a plurality of symbols. Subframes include: uplink subframes (denoted by "U"), downlink subframes (denoted by "D"), and special subframes (denoted by "S"). In TDD-LTE, different uplink-downlink time configurations are supported, and an uplink-downlink subframe configuration may be adjusted based on different service types, so as to meet requirements of different uplink-downlink asymmetric services. Different uplink-downlink subframe configurations within a same radio frame are shown in FIG. 1.

In a process of future TDD-LTE evolution, for corresponding performance enhancement, this TDD structure may evolve to a new structure, as shown in FIG. 2. In the new TDD structure, two special subframe types are added. A special subframe type 1 includes mainly downlink symbols, and a special subframe type 2 includes mainly uplink symbols. A location of a guard period (GP) in each special subframe format may be changed through configuration. As shown in FIG. 2, GPs are located at a last but one symbol and a second symbol, respectively.

In an existing LTE technology, a transmission time interval (TTI) is a minimum granularity of a data transmission interval, and is one subframe including 14 symbols. To reduce a system transmission latency, a short transmission time interval (sTTI) mechanism is introduced, with which a data scheduling granularity in time domain is reduced. Compared with the technology in the current LTE system, the sTTI mechanism reduces duration of a TTI. To be specific, the scheduling granularity is reduced from an original duration of 14 symbols to seven symbols, three or four symbols, two symbols, or one symbol. This mechanism reduces a waiting time in uplink/downlink sending, thereby reducing a system transmission latency.

A timing design for the existing new TDD frame structure can ensure normal system operation. In TDD-LTE, uplink scheduling timing and downlink feedback timing are designed on a per subframe basis. An interval from downlink subframe scheduling to uplink subframe scheduling is a fixed value, and an interval from downlink data sending to uplink feedback is a fixed value. Therefore, the existing TDD timing design cannot be applied to a mechanism combining the TDD new frame structure and sTTIs.

SUMMARY

Embodiments of the present invention provide a timing method for time division duplex communication, an uplink/downlink data scheduling method, a base station, and user equipment, so that uplink scheduling timing and/or downlink feedback timing can meet a timing requirement after a TDD new frame structure is combined with short transmission time intervals.

According to a first aspect, a timing method for time division duplex communication is provided. The method includes:

determining, for a given radio frame structure, whether grouping needs to be performed on uplink short transmission time intervals sTTIs and/or downlink sTTIs; and when grouping needs to be performed on the uplink sTTIs and the downlink sTTIs, grouping and pairing the uplink sTTIs and the downlink sTTIs, adding first indication information to control signaling, and sending the control signaling to user equipment, where the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling;

when grouping needs to be performed only on the uplink sTTIs, grouping the uplink sTTIs into one group, where during uplink data scheduling, all downlink sTTIs that are at an interval of k or more sTTIs from the uplink sTTIs in the uplink sTTI group are usable for sending uplink data scheduling instructions, and k is a preset minimum scheduling gap; and adding second indication information to the control signaling, where the second indication information is used to indicate an uplink sTTI sequence number in an uplink sTTI group for uplink data transmission; or when grouping does not need to be performed on the uplink sTTIs or the downlink sTTIs, instructing to transmit uplink data or send feedback to downlink data scheduling in a first uplink sTTI that is at an interval of k or more sTTIs from a downlink sTTI in which an uplink or downlink data scheduling instruction is sent.

In this design, by determining whether grouping needs to be performed on uplink/downlink short transmission time intervals, it is determined, for different grouping requirements, whether addition of indication information to control signaling is required to indicate to user equipment an uplink short transmission time interval sequence number in an uplink short transmission time interval group for uplink data transmission or feedback to downlink data scheduling. Alternatively, addition of indication information to control signaling is not required, and uplink data transmission or feedback to downlink data scheduling is performed in an uplink short transmission time interval determined according to a default rule. In this way, uplink scheduling timing and/or downlink feedback timing for any downlink sTTI in which uplink/downlink data scheduling is performed can meet a timing requirement after a TDD new frame structure is combined with short transmission time intervals.

With reference to the first aspect, in a possible design, the determining, for a given radio frame structure, whether grouping needs to be performed on uplink short transmission time intervals sTTIs and/or downlink sTTIs includes:

for the given radio frame structure, if a sTTI includes one symbol, two symbols, or three or four symbols, determining that grouping needs to be performed on the uplink sTTIs and the downlink sTTIs;

for a first radio frame structure, if a sTTI includes seven symbols, determining that grouping needs to be performed only on the uplink sTTIs; and for a second radio frame structure, if a sTTI includes seven symbols, determining that grouping does not need to be performed on the uplink sTTIs or the downlink sTTIs; where the given radio frame structure includes the first radio frame structure and the second radio frame structure.

In this design, it is determined, based on a quantity of symbols included in a sTTI, whether grouping needs to be performed on the uplink sTTIs or the downlink sTTIs.

With reference to the first aspect, in another possible design, the grouping and pairing the uplink sTTIs and the downlink sTTIs when grouping needs to be performed on the uplink sTTIs and the downlink sTTIs includes:

grouping consecutive uplink sTTIs whose quantity is a in a radio frame into one segment, to obtain at least one uplink sTTI segment, where a is a positive integer greater than or equal to 2;

for each uplink sTTI segment, determining a downlink sTTI segment corresponding to the uplink sTTI segment, where a sequence number of a start sTTI in the downlink sTTI segment is m−k+1, and a sequence number of an end sTTI in the downlink sTTI segment is n−k, where m is a sequence number of a previous uplink sTTI of the uplink sTTI segment, and n is a sequence number of a last uplink sTTI in the uplink sTTI segment;

dividing each uplink sTTI segment into at least one uplink sTTI group; and dividing the downlink sTTI segment corresponding to the uplink sTTI segment into at least one downlink sTTI group, and pairing the at least one downlink sTTI group with the at least one uplink sTTI group.

In this design, the downlink sTTI segment is determined based on the uplink sTTI segment, the uplink sTTI segment and the downlink sTTI segment are divided to groups, and then the uplink sTTI group and the downlink sTTI group are paired, so as to complete grouping and pairing of uplink sTTIs and downlink sTTIs.

With reference to the first aspect, in still another possible design, if a sTTI with the sequence number m−k+1 is an uplink sTTI, the start sTTI in the downlink sTTI segment is a first downlink sTTI after a sequence number m−k; and/or if the quantity a for the uplink sTTI segment is greater than k, the sequence number of the end sTTI in the downlink sTTI segment is n−a.

This design supplements the grouping of uplink sTTIs and downlink sTTIs with a particular grouping case.

With reference to the first aspect, in yet another possible design, the first indication information or the second indication information is one bit.

In this design, addition of only one bit to control signaling is required to indicate an uplink sTTI sequence number in an uplink sTTI group for uplink data transmission or feedback to downlink data scheduling. Signaling overheads are low.

According to a second aspect, an uplink/downlink data scheduling method is provided. The method includes:

when an uplink data scheduling or downlink data scheduling instruction sent in a downlink sTTI group is received, receiving control signaling, where the control signaling includes additional indication information, the indication information is used to indicate an uplink sTTI sequence number in an uplink sTTI group for uplink data transmission or feedback to downlink data scheduling, and the uplink sTTI group is corresponding to the downlink sTTI group; and transmitting uplink data or sending feedback to downlink data scheduling in an uplink sTTI corresponding to the uplink sTTI sequence number that is in the uplink sTTI group and that is indicated by the indication information.

In this design, a base station has added the indication information to the control signaling to indicate to user equipment the uplink short transmission time interval sequence number in the uplink short transmission time interval group for uplink data transmission or feedback to downlink data scheduling. Therefore, uplink scheduling timing and/or downlink feedback timing for any downlink sTTI in which uplink/downlink data scheduling is performed can meet a timing requirement after a TDD new frame structure is combined with short transmission time intervals.

According to a third aspect, a base station is provided. The base station includes:

a determining unit, configured to determine, for a given radio frame structure, whether grouping needs to be performed on uplink short transmission time intervals sTTIs and/or downlink sTTIs;

a grouping unit, configured to, when grouping needs to be performed on the uplink sTTIs and the downlink sTTIs, group and pair the uplink sTTIs and the downlink sTTIs;

an indication unit, configured to add first indication information to control signaling, where the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling; where the grouping unit is further configured to, when grouping needs to be performed only on the uplink sTTIs, group the uplink sTTIs into one group, where during uplink data scheduling, all downlink sTTIs that are at an interval of k or more sTTIs from the uplink sTTIs in the uplink sTTI group are usable for sending uplink data scheduling instructions, and k is a preset minimum scheduling gap; and the indication unit is further configured to add second indication information to the control signaling, where the second indication information is used to indicate an uplink sTTI sequence number in an uplink sTTI group for uplink data transmission; and a sending unit, configured to send the control signaling to user equipment; and the indication unit is further configured to, when grouping does not need to be performed on the uplink sTTIs or the downlink sTTIs, instruct to transmit uplink data or send feedback to downlink data scheduling in a first uplink sTTI that is at an interval of k or more sTTIs from a downlink sTTI in which an uplink or downlink data scheduling instruction is sent.

With the same inventive idea as a basis, for a problem-resolving principle and beneficial effects of the apparatus, reference may be made to the first aspect, the possible implementations of the first aspect, and the beneficial effects thereof. Therefore, for implementation of the apparatus, reference may be made to implementation of the method, and repetition is omitted.

According to a fourth aspect, user equipment is provided. The user equipment includes:

a receiving unit, configured to receive control signaling when an uplink data scheduling or downlink data scheduling instruction sent in a downlink sTTI group is received, where the control signaling includes additional indication information, the indication information is used to indicate an uplink sTTI sequence number in an uplink sTTI group for uplink data transmission or feedback to downlink data scheduling, and the uplink sTTI group is corresponding to the downlink sTTI group; and a sending unit, configured to transmit uplink data or send feedback to downlink data scheduling in an uplink sTTI corresponding to the uplink sTTI sequence number that is in the uplink sTTI group and that is indicated by the indication information.

According to a fifth aspect, a base station is provided. The base station includes a processor and a transmitter, where the processor is configured to determine, for a given radio frame structure, whether grouping needs to be performed on uplink short transmission time intervals sTTIs and/or downlink sTTIs;

the processor is further configured to, when grouping needs to be performed on the uplink sTTIs and the downlink sTTIs, group and pair the uplink sTTIs and the downlink sTTIs, add first indication information to control signaling, and send the control signaling to user equipment, where the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling;

the processor is further configured to, when grouping needs to be performed only on the uplink sTTIs, group the uplink sTTIs into one group, where during uplink data scheduling, all downlink sTTIs that are at an interval of k or more sTTIs from the uplink sTTIs in the uplink sTTI group are usable for sending uplink data scheduling instructions, and k is a preset minimum scheduling gap; and adding second indication information to the control signaling, where the second indication information is used to indicate an uplink sTTI sequence number in an uplink sTTI group for uplink data transmission;

the transmitter is configured to send the control signaling to user equipment; and the processor is further configured to, when grouping does not need to be performed on the uplink sTTIs or the downlink sTTIs, instruct to transmit uplink data or send feedback to downlink data scheduling in a first uplink sTTI that is at an interval of k or more sTTIs from a downlink sTTI in which an uplink or downlink data scheduling instruction is sent.

With the same inventive idea as a basis, for a problem-resolving principle and beneficial effects of the device, reference may be made to the first aspect, the possible implementations of the first aspect, and the beneficial effects thereof. Therefore, for implementation of the device, reference may be made to implementation of the method, and repetition is omitted.

According to a sixth aspect, user equipment is provided. The user equipment includes a receiver and a transmitter, where the receiver is configured to receive control signaling when an uplink data scheduling or downlink data scheduling instruction sent in a downlink sTTI group is received, where the control signaling includes additional indication information, the indication information is used to indicate an uplink sTTI sequence number in an uplink sTTI group for uplink data transmission or feedback to downlink data scheduling, and the uplink sTTI group is corresponding to the downlink sTTI group; and the transmitter is configured to transmit uplink data or send feedback to downlink data scheduling in an uplink sTTI corresponding to the uplink sTTI sequence number that is in the uplink sTTI group and that is indicated by the indication information.

The embodiments of the present invention provide a timing method for time division duplex communication, an uplink/downlink data scheduling method, a base station, and user equipment. By determining whether grouping needs to be performed on the uplink/downlink short transmission time intervals, it is determined, for different grouping requirements, whether addition of indication information to control signaling is required to indicate to user equipment an uplink short transmission time interval sequence number in an uplink short transmission time interval group for uplink data transmission or feedback to downlink data scheduling. Alternatively, addition of indication information to control signaling is not required, and uplink data transmission or feedback to downlink data scheduling is performed in an uplink short transmission time interval determined according to a default rule. In this way, uplink scheduling timing and/or downlink feedback timing for any downlink sTTI in which uplink/downlink data scheduling is performed can meet a timing requirement after a TDD new frame structure is combined with short transmission time intervals.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a timing method for time division duplex communication, an uplink/downlink data scheduling method, a base station, and user equipment. By determining whether grouping needs to be performed on the uplink/downlink short transmission time intervals, it is determined, for different grouping requirements, whether addition of indication information to control signaling is required to indicate to user equipment an uplink short transmission time interval sequence number in an uplink short transmission time interval group for uplink data transmission or feedback to downlink data scheduling. Alternatively, addition of indication information to control signaling is not required, and uplink data transmission or feedback to downlink data scheduling is performed in an uplink short transmission time interval determined according to a default rule. In this way, uplink scheduling timing and/or downlink feedback timing for any downlink sTTI in which uplink/downlink data scheduling is performed can meet a timing requirement after a TDD new frame structure is combined with short transmission time intervals.

Figure 4:
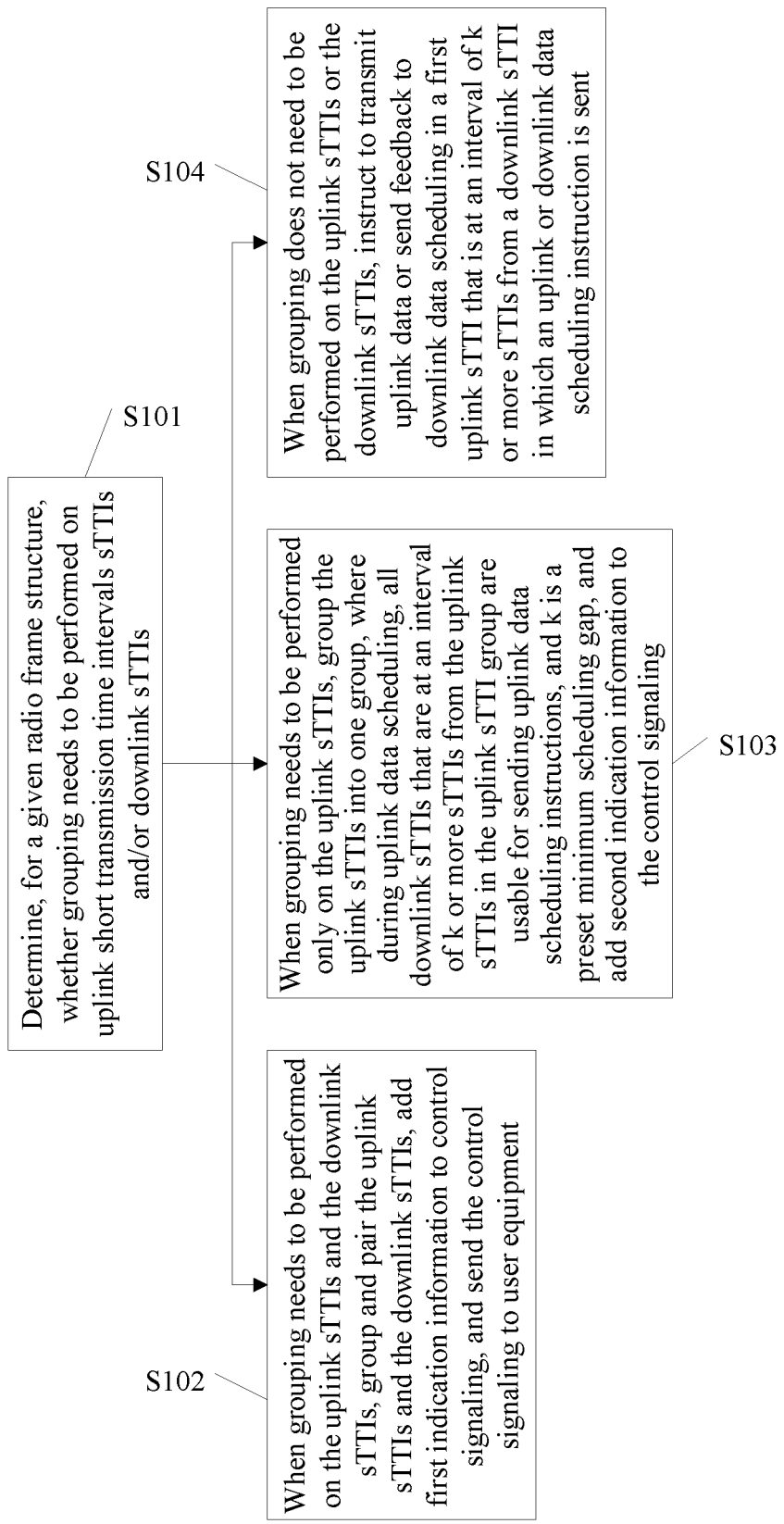
FIG. 4 shows a flowchart of a timing method for time division duplex communication according to an embodiment of the present invention.

FIG. 4 shows a flowchart of a timing method for time division duplex communication according to an embodiment of the present invention. The method includes the following steps.

S101: Determine, for a given radio frame structure, whether grouping needs to be performed on uplink short transmission time intervals sTTIs and/or downlink sTTIs.

Figures 1, 2:
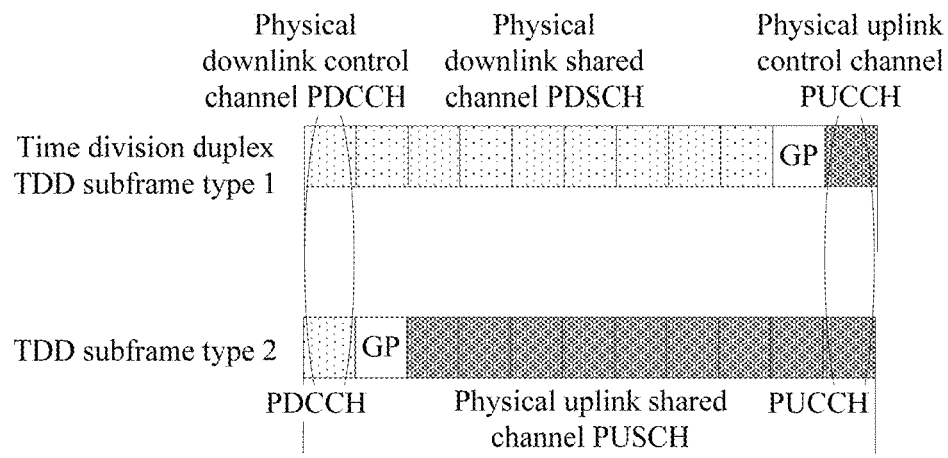
FIG. 1 shows existing uplink-downlink subframe configurations for a TDD-LTE radio frame.
FIG. 2 shows two future TDD evolved subframe structures.
Figure 3:
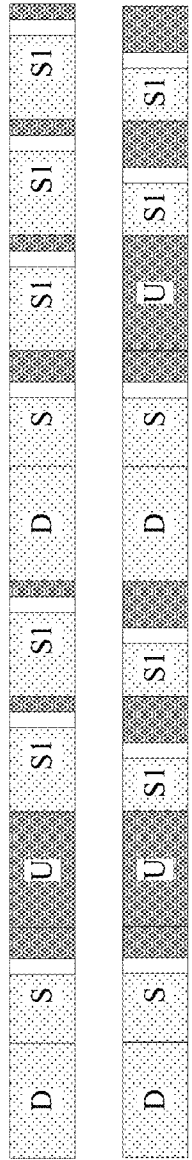
FIG. 3 shows two radio frame structures for a new subframe type 1 shown in FIG. 2.

The given radio frame structure herein refers to two radio frame structures in a new special subframe type 1 shown in FIG. 3. In a first radio frame structure in FIG. 3, in a radio frame structure 1, a subframe S includes nine downlink symbols, one GP, and four uplink symbols, and a subframe S1 includes 11 downlink symbols, one GP, and two uplink symbols. In a second radio frame structure in FIG. 3, in a radio frame structure 2, a subframe S includes nine downlink symbols, one GP, and four uplink symbols, and a subframe S1 includes seven downlink symbols, one GP, and six uplink symbols.

In this embodiment, uplink scheduling timing and downlink feedback timing are designed on a per short transmission time interval basis. In other words, a short transmission time interval is defined herein as a minimum scheduling unit in time domain.

One radio frame includes a plurality of uplink/downlink sTTIs. Whether grouping needs to be performed on uplink sTTIs and/or downlink sTTIs is considered based on a difference in the two radio frame structures and different uplink/downlink symbols included in a sTTI, so as to implement timing design for a mechanism combining a TDD new frame structure and sTTIs.

Specifically, for the given radio frame structure, if a sTTI includes one symbol, two symbols, or three or four symbols, it is determined that grouping needs to be performed on the uplink sTTIs and the downlink sTTIs.

For a first radio frame structure, if a sTTI includes seven symbols, it is determined that grouping needs to be performed only on the uplink sTTIs.

For a second radio frame structure, if a sTTI includes seven symbols, it is determined that grouping does not need to be performed on the uplink sTTIs or the downlink sTTIs.

The following describes these one by one by using specific examples.

S102: When grouping needs to be performed on the uplink sTTIs and the downlink sTTIs, group and pair the uplink sTTIs and the downlink sTTIs, add first indication information to control signaling, and send the control signaling to user equipment, where the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling.

In this step, for the given radio frame structure, if a sTTI includes one symbol, two symbols, or three or four symbols, it is determined that grouping needs to be performed on the uplink sTTIs and the downlink sTTIs.

In the solution in this embodiment, to reduce grouping design complexity, a same uplink/downlink group is used for designing timing for uplink scheduling granting and timing for downlink data feedback, and a solution combining grouping and separate indication is used for timing design. A grouping design principle is as follows.

1. Determine to-be-Grouped Uplink sTTIs and Perform Uplink sTTI Segmenting.

For sTTIs in a radio frame, when a quantity of consecutive sTTIs is greater than or equal to 2, uplink sTTI segmenting is performed. Specifically, consecutive uplink sTTIs whose quantity is a in the radio frame are grouped into one segment, to obtain at least one uplink sTTI segment, where a is a positive integer greater than or equal to 2.

2. Determine to-be-Grouped Downlink sTTIs and Perform Downlink sTTI Segmenting.

On a basis of a sequence number m of a previous uplink sTTI of the segment of consecutive uplink sTTIs, a start sequence number of the to-be-grouped downlink sTTIs is m−k+1 (if a sTTI with the sequence number m−k+1 is an uplink sTTI, search forward for a nearest downlink TTI and use a sequence number of this downlink TTI as the start sequence number). On a basis of a sequence number n of a last uplink sTTI in the segment of consecutive uplink sTTIs, an end sequence number of the to-be-segmented downlink sTTIs is n−k. This segment of consecutive downlink sTTIs has a same quantity a as the segment of consecutive uplink sTTIs, and the segment of consecutive downlink sTTIs are divided as evenly as possible. k is a preset minimum scheduling gap, and preferably, k is equal to 4.

3. Set a Correspondence Between the Uplink and Downlink Short TTI Segments.

A one-to-one correspondence is set based on group sequence numbers of the uplink and downlink short TTIs. Specifically, each uplink sTTI segment is divided into at least one downlink sTTI group; and a downlink sTTI segment corresponding to the uplink sTTI segment is divided into at least one downlink sTTI group, and the at least one downlink sTTI group is paired with the at least one uplink sTTI group.

During grouping, in a particular case, if a sTTI with the sequence number m−k+1 is an uplink sTTI, the start sTTI in the downlink sTTI segment is a first downlink sTTI after a sequence number m−k; and/or if the quantity a for the uplink sTTI segment is greater than k, the sequence number of the end sTTI in the downlink sTTI segment is n-a.

After grouping and pairing of the uplink sTTIs and the downlink sTTIs are completed, when uplink data scheduling or downlink data scheduling is performed for user equipment in one or more downlink sTTIs in a downlink sTTI group, a base station adds one piece of first indication information to control signaling, which may be specifically adding 1-bit information to downlink control information (DCI), and sends the control signaling to the user equipment, where the first indication information is used to indicate an uplink sTTI sequence number in an uplink sTTI group for uplink data transmission or feedback to downlink data scheduling, and the uplink sTTI group is corresponding to the downlink sTTI group for uplink data scheduling or downlink data scheduling. After receiving the control signaling, the user equipment transmits uplink data or sends feedback to downlink data scheduling in an uplink sTTI corresponding to the uplink sTTI sequence number that is in the uplink sTTI group and that is indicated by the indication information.

The first indication information is one bit. For one uplink sTTI group including two sTTIs, for example, an uplink group including sTTIs 13 and 14, an eNB configures the bit such that setting the bit indicates the sTTI 13 and resetting the bit indicates the sTTI 14, or vice versa.

S103: When grouping needs to be performed only on the uplink sTTIs, group the uplink sTTIs into one group, where during uplink data scheduling, all downlink sTTIs that are at an interval of k or more sTTIs from the uplink sTTIs in the uplink sTTI group are usable for sending uplink data scheduling instructions, and k is a preset minimum scheduling gap; and add second indication information to the control signaling, where the second indication information is used to indicate an uplink sTTI sequence number in an uplink sTTI group for uplink data transmission.

For a given first radio frame structure, if a sTTI includes seven symbols, it is determined that grouping needs to be performed only on the uplink sTTIs, that is, grouping is no longer performed on the downlink sTTIs. During uplink data scheduling, all downlink sTTIs that are at an interval of k or more sTTIs from the uplink sTTIs in the uplink sTTI group are usable for sending uplink data scheduling instructions, where k is a preset minimum scheduling gap, and a preferable value range of k is 1 to 4. Second indication information is added to the control signaling, where the second indication information is used to indicate an uplink sTTI sequence number in an uplink sTTI group for uplink data transmission. The second indication information is one bit. During uplink data scheduling, an uplink sTTI for uplink data transmission cannot include a downlink symbol or a GP.

For downlink data scheduling, a downlink sTTI is corresponding to a first uplink sTTI that is at an interval of four or more sTTIs from the downlink sTTI, and timing for feedback to downlink data scheduling is so determined. During downlink data scheduling, a downlink sTTI for downlink data feedback may include a downlink symbol or a GP.

S104: When grouping does not need to be performed on the uplink sTTIs or the downlink sTTIs, instruct to transmit uplink data or send feedback to downlink data scheduling in a first uplink sTTI that is at an interval of k or more sTTIs from a downlink sTTI in which an uplink or downlink data scheduling instruction is sent.

For a given second radio frame structure, if a sTTI includes seven symbols, it is determined that grouping does not need to be performed on the uplink sTTIs or the downlink sTTIs. A timing design is that uplink data transmission or feedback to downlink data scheduling is performed in a first uplink sTTI that is at an interval of k or more sTTIs from a downlink sTTI in which an uplink or downlink data scheduling instruction is sent.

The following describes uplink/downlink timing configurations for the two radio frame structures of the new special subframe type 1 shown in FIG. 3.

1. Uplink/Downlink Timing Configurations for the First Radio Frame Structure in FIG. 3

Based on a quantity of symbols included in a sTTI in a radio frame, the uplink/downlink timing configurations for the first radio frame structure in FIG. 3 are described as follows.

(1) 1-Symbol sTTIs

Figure 5:
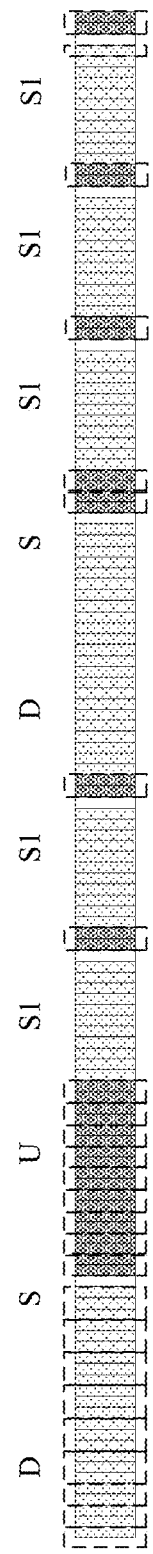
FIG. 5 shows grouping for a radio frame structure 1 with 1-symbol sTTIs.

FIG. 5 shows grouping for the radio frame structure 1 with 1-symbol sTTIs, where one radio frame includes 140 sTTIs.

As shown in FIG. 5, in a complete radio frame, there are seven relatively long blocks of consecutive uplink sTTIs. According to a rule 1, to-be-grouped uplink sTTIs are determined and uplink sTTI grouping is performed. Sequence numbers of the to-be-grouped sTTIs include six portions: a first portion includes uplink sTTIs 24 to 41, a second portion includes uplink sTTIs 54 to 55, a third portion includes uplink sTTIs 68 to 69, a fourth portion includes uplink sTTIs 94 to 97, a fifth portion includes uplink sTTIs 110 to 111, a sixth portion includes uplink sTTIs 124 to 125, and a seventh portion includes uplink sTTIs 138 to 139. In consideration of a smaller quantity of bits used for indication, two uplink sTTIs are grouped into one group.

According to a rule 2, to-be-grouped downlink sTTIs are determined and downlink sTTI grouping is performed. Therefore, downlink sTTIs corresponding to the first portion of uplink sTTI groups are in a range of 136 and 0 to 22. In this case, m=139, n=41, and k=4.

Specifically, a start sequence number of to-be-grouped downlink sTTIs is m−k+1=139−4+1=136, and an end sequence number of to-be-grouped downlink sTTIs is n−k=41−4=37. Because sTTIs with sequence numbers 24 to 37 are still uplink sTTIs, and backward, no downlink sTTI is found until a sequence number 22, the end sequence number is 22. Therefore, the downlink sTTIs corresponding to the first portion of uplink sTTI groups are in the range of 136 and 0 to 22. For downlink segments corresponding to the other portions, similar calculation is applied, and further description is not provided herein. Downlink sTTIs corresponding to the second portion of uplink sTTI groups are in a range of 42 to 51; downlink sTTIs corresponding to the third portion of uplink sTTI groups are in a range of 52 and 56 to 65; downlink sTTIs corresponding to the fourth portion of uplink sTTI groups are in a range of 66 and 70 to 92; downlink sTTIs corresponding to the fifth portion of uplink sTTI groups are in a range of 98 to 107; downlink sTTIs corresponding to the sixth portion of uplink sTTI groups are in a range of 108 and 112 to 121; and downlink sTTIs corresponding to the seventh portion of uplink sTTI groups are in a range of 122 and 126 to 135.

Thereafter, the downlink sTTIs are grouped and paired based on a quantity of uplink sTTI groups.

The first portion:

sTTIs 136 and 0 are grouped into one group, corresponding to sTTIs 24 and 25;

sTTIs 1 and 2 are grouped into one group, corresponding to sTTIs 26 and 27;

sTTIs 3 and 4 are grouped into one group, corresponding to sTTIs 28 and 29;

sTTIs 5, 6, and 7 are grouped into one group, corresponding to sTTIs 30 and 31;

sTTIs 8, 9, and 10 are grouped into one group, corresponding to sTTIs 32 and 33;

sTTIs 11, 12, and 13 are grouped into one group, corresponding to sTTIs 34 and 35;

sTTIs 14, 15, and 16 are grouped into one group, corresponding to sTTIs 36 and 37;

sTTIs 17, 18, and 19 are grouped into one group, corresponding to sTTIs 38 and 39;

sTTIs 20, 21, and 22 are grouped into one group, corresponding to sTTIs 40 and 41.

The second portion:

sTTIs 42 to 51 are grouped into one group, corresponding to sTTIs 54 and 55.

The third portion:

sTTIs 52, and 56 to 65 are grouped into one group, corresponding to sTTIs 68 and 69.

The fourth portion:

sTTIs 66, and 70 to 80 are grouped into one group, corresponding to sTTIs 94 and 95;

sTTIs 81 to 92 are grouped into one group, corresponding to sTTIs 96 and 97.

The fifth portion:

sTTIs 98 to 107 are grouped into one group, corresponding to sTTIs 110 and 111.

The sixth portion:

sTTIs 108, and 112 to 121 are grouped into one group, corresponding to sTTIs 124 and 125.

The seventh portion:

sTTIs 122, and 126 to 135 are grouped into one group, corresponding to sTTIs 138 and 139.

In addition, the eNB adds 1-bit information to existing DCI (regardless of whether for uplink data scheduling or downlink data scheduling) to indicate a sTTI in an uplink sTTI group. For one uplink sTTI group including two sTTIs, for example, an uplink group including sTTIs 24 and 25, the eNB configures the bit such that setting the bit indicates the sTTI 24 and resetting the bit indicates the sTTI 25, or vice versa.

After receiving an uplink data scheduling instruction, if an uplink sTTI group corresponding to a current downlink sTTI includes two sTTIs, user equipment (UE) retrieves the new bit and determines in which sTTI in the sTTI group the UE is to perform uplink data transmission.

After receiving a downlink data scheduling instruction, if an uplink sTTI group corresponding to a current downlink sTTI includes two sTTIs, the UE retrieves the new bit and determines in which sTTI in the sTTI group the UE is to send feedback data.

(2) 2-Symbol sTTIs

Figure 6:
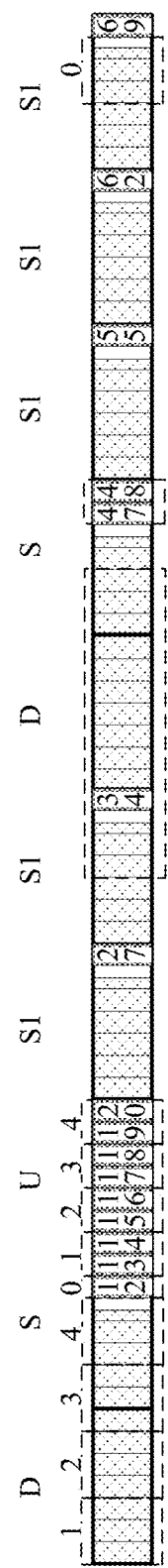
FIG. 6 shows grouping for a radio frame structure 1 with 2-symbol sTTIs.

FIG. 6 shows grouping for the radio frame structure 1 with 2-symbol sTTIs, where one radio frame includes 70 sTTIs.

As shown in FIG. 6, in a complete radio frame, there are two relatively long blocks of consecutive uplink sTTIs. According to a rule 1, to-be-grouped uplink sTTIs are determined and uplink sTTI grouping is performed. Sequence numbers of the to-be-grouped include two portions: a first portion includes uplink sTTIs 12 to 20, and a second portion includes uplink sTTIs 47 to 48. In consideration of a smaller quantity of bits used for indication, two uplink sTTIs are grouped into one group.

According to a rule 2, to-be-grouped downlink sTTIs are determined and downlink sTTI grouping is performed. Therefore, downlink sTTIs corresponding to the first portion of uplink sTTI groups are in a range of 66 to 68 and 0 to 11. In this case, m=69, n=20, and k=4. Specifically, a start sequence number of to-be-grouped downlink sTTIs is m−k+1=69−4+1=66, and an end sequence number of to-be-grouped downlink sTTIs is n−k=20−4=16. Because backward, sTTIs with sequence numbers 16 to 12 are still uplink sTTIs, and no downlink sTTI is found until a sequence number 11, the end sequence number is 11. Therefore, the downlink sTTIs corresponding to the first portion of uplink sTTI groups are in the range of 66 to 68 and 0 to 11. Downlink sTTIs corresponding to the second portion of uplink sTTI groups are in a range of 31 to 33 and 35 to 44. In this case, m=34, n=48, and k=4. Specifically, a start sequence number of to-be-grouped downlink sTTIs is m−k+1=34−4+1=31, and an end sequence number of to-be-grouped downlink sTTIs is n−k=48−4=44. Therefore, the downlink sTTIs corresponding to the second portion of uplink sTTI groups are in the range of 31 to 33 and 35 to 44.

Thereafter, the downlink sTTIs are grouped and paired based on a quantity of uplink sTTI groups.

The first portion:

sTTIs 66, 67, and 68 are grouped into one group, corresponding to a sTTI 12;

sTTIs 0, 1, and 2 are grouped into one group, corresponding to sTTIs 13 and 14;

sTTIs 3, 4, and 5 are grouped into one group, corresponding to sTTIs 15 and 16;

sTTIs 6, 7, and 8 are grouped into one group, corresponding to sTTIs 17 and 18;

sTTIs 9, 10, and 11 are grouped into one group, corresponding to sTTIs 19 and 20.

It should be noted that no limitation is imposed on the grouping and pairing herein.

The second portion:

sTTIs 31, 32, 33, 35, 36, 37, 38, 39, 40, 41, 42, 43, and 44 are grouped into one group, corresponding to sTTIs 47 and 48.

Other downlink sTTIs are corresponding to first uplink sTTIs that are at an interval of four or more sTTIs from these other downlink sTTIs. For example, a sTTI 21 is corresponding to a sTTI 27.

In addition, an eNodeB (eNB) adds 1-bit information to existing downlink control information (regardless of whether for uplink data scheduling or downlink data scheduling) to indicate a sTTI in an uplink sTTI group. For one uplink sTTI group including two sTTIs, for example, an uplink group including sTTIs 13 and 14, the eNB configures the bit such that setting the bit indicates the sTTI 13 and resetting the bit indicates the sTTI 14, or vice versa.

After receiving an uplink data scheduling instruction, if an uplink sTTI group corresponding to a current downlink sTTI includes two sTTIs, UE retrieves the new bit and determines in which sTTI in the sTTI group the UE is to perform uplink data transmission.

After receiving a downlink data scheduling instruction, if an uplink sTTI group corresponding to a current downlink sTTI includes two sTTIs, the UE retrieves the new bit and determines in which sTTI in the sTTI group the UE is to send feedback data.

(3) 3/4-Symbol sTTIs

Figure 7:
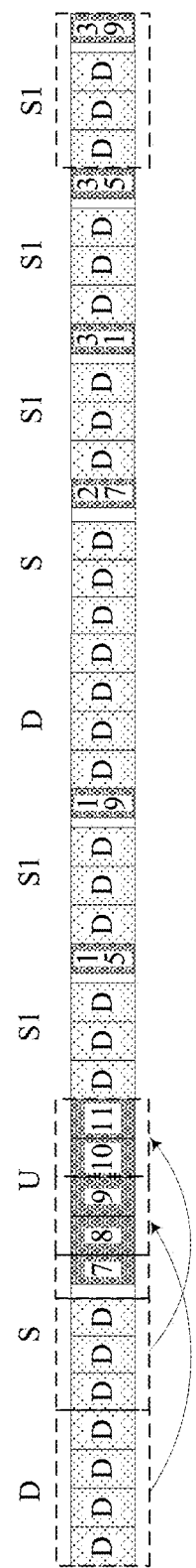
FIG. 7 shows grouping for a radio frame structure 1 with 3/4-symbol sTTIs.

FIG. 7 shows grouping for the radio frame structure 1 with 3/4-symbol sTTIs, where one radio frame includes 40 sTTIs.

As shown in FIG. 7, in a complete radio frame, there is one relatively long block of consecutive uplink sTTIs. According to a rule 1, to-be-grouped uplink sTTIs are determined and uplink sTTI grouping is performed. Sequence numbers of the to-be-grouped uplink sTTIs include one portion, that is, uplink sTTIs 7 to 11. In consideration of a smaller quantity of bits used for indication, two uplink sTTIs are grouped into one group.

According to a rule 2, to-be-grouped downlink sTTIs are determined and downlink sTTI grouping is performed. Therefore, downlink sTTIs corresponding to this portion of uplink sTTI groups are in a range of 36 to 68 and 0 to 6. In this case, m=39, n=11, and k=4. Specifically, a start sequence number of to-be-grouped downlink sTTIs is m−k+1=39−4+1=36, and an end sequence number of to-be-grouped downlink sTTIs is n−k=11−4=7. Because a sTTI with the sequence number 7 is still an uplink sTTI, a first downlink sTTI backward is found, whose sequence number is 6. Therefore, the sequence number 6 is the end sequence number of to-be-grouped downlink sTTIs. Then the downlink sTTIs corresponding to this portion of uplink sTTI groups are in the range of 36 to 38 and 0 to 6.

Thereafter, the downlink sTTIs are grouped and paired based on a quantity of uplink sTTI groups:

sTTIs 36, 37, and 38 are grouped into one group, corresponding to a sTTI 7;

sTTIs 0, 1, 2, and 3 are grouped into one group, corresponding to sTTIs 8 and 9;

sTTIs 4, 5, and 6 are grouped into one group, corresponding to sTTIs 10 and 11.

It should be noted that no limitation is imposed on the grouping and pairing herein.

Other downlink sTTIs are corresponding to first uplink sTTIs that are at an interval of four or more sTTIs from these other downlink sTTIs. For example, a sTTI 12 is corresponding to a sTTI 19.

In addition, an eNB adds 1-bit information to existing DCI (regardless of whether for uplink data scheduling or downlink data scheduling) to indicate a sTTI in an uplink sTTI group. For one uplink sTTI group including two sTTIs, for example, an uplink group including sTTIs 8 and 9, the eNB configures the bit such that setting the bit indicates the sTTI 8 and resetting the bit indicates the sTTI 9, or vice versa.

After receiving an uplink data scheduling instruction, if an uplink sTTI group corresponding to a current downlink sTTI includes two sTTIs, UE retrieves the new bit and determines in which sTTI in the sTTI group the UE is to perform uplink data transmission.

After receiving a downlink data scheduling instruction, if an uplink sTTI group corresponding to a current downlink sTTI includes two sTTIs, the user equipment UE retrieves the new bit and determines in which sTTI in the sTTI group the UE is to send feedback data.

(4) 7-Symbol sTTIs

Figure 8:
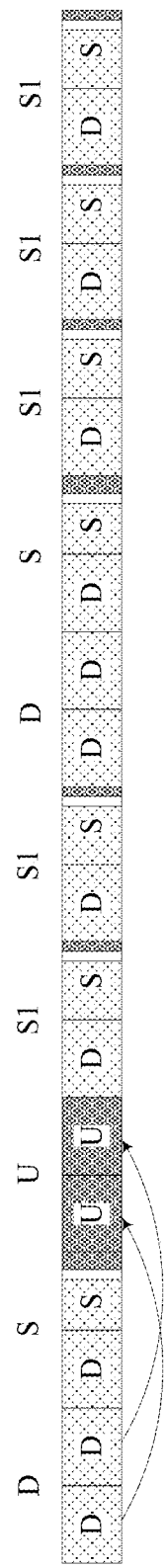
FIG. 8 shows grouping for a radio frame structure 1 with 7-symbol sTTIs.

FIG. 8 shows grouping for the radio frame structure 1 with 7-symbol sTTIs, where one radio frame includes 20 sTTIs.

For 7-symbol sTTIs, grouping is no longer performed on downlink sTTIs, and the only two uplink sTTIs are grouped into one group.

For uplink data scheduling, all sTTIs at an interval of four or more sTTIs from the uplink sTTIs in the sTTI group are usable for scheduling the uplink sTTIs in the sTTI group. During uplink data scheduling, an uplink sTTI must be a complete uplink sTTI. For example, if uplink data scheduling is sent in a downlink sTTI with a sequence number 0, uplink data transmission may be performed in an uplink sTTI with a sequence number 4; and if uplink data scheduling is sent in a downlink sTTI with a sequence number 1, uplink data transmission may be performed in an uplink sTTI with a sequence number 5. In addition, an eNB adds 1-bit information to existing DCI (regardless of whether for uplink data scheduling or downlink data scheduling) to indicate a sTTI in an uplink sTTI group. After receiving an uplink data scheduling instruction, UE retrieves the new bit and determines in which sTTI in the sTTI group the UE is to perform uplink data transmission.

For downlink data scheduling, a downlink sTTI is corresponding to a first uplink sTTI that is at an interval of four or more sTTIs from the downlink sTTI, and timing for downlink data feedback is so determined. During downlink data scheduling, an uplink sTTI for sending feedback data may not be a complete uplink sTTI. For example, if downlink data is sent in a downlink sTTI with a sequence number 2, data feedback may be sent in an uplink symbol in a sTTI with a sequence number 5.

2. Uplink/Downlink Timing Configurations for the Second Radio Frame Structure in FIG. 3

Based on a quantity of symbols included in a sTTI in a radio frame, the uplink/downlink timing configurations for the second radio frame structure in FIG. 3 are described as follows.

(1) 1-Symbol sTTIs

Figure 9:
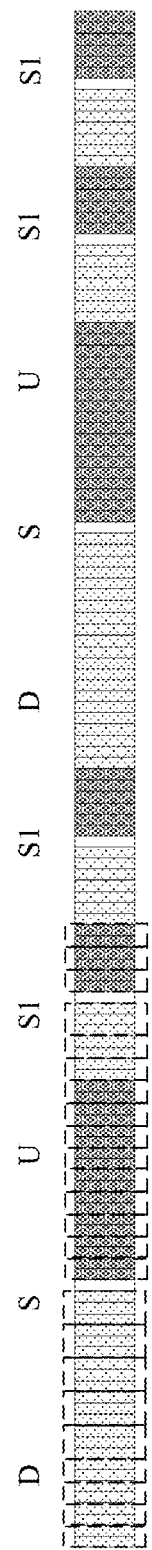
FIG. 9 shows grouping for a radio frame structure 2 with 1-symbol sTTIs.

FIG. 9 shows grouping for the radio frame structure 2 with 1-symbol sTTIs, where one radio frame includes 140 sTTIs.

As shown in FIG. 9, in a complete radio frame, there are six relatively long blocks of consecutive uplink sTTIs. According to a rule 1, to-be-grouped uplink sTTIs are determined and uplink sTTI grouping is performed. Sequence numbers of the to-be-grouped include six portions: a first portion includes uplink sTTIs 24 to 41, a second portion includes uplink sTTIs 50 to 55, a third portion includes uplink sTTIs 64 to 69, a fourth portion includes uplink sTTIs 94 to 111, a fifth portion includes uplink sTTIs 120 to 125, and a sixth portion includes uplink sTTIs 134 to 139. In consideration of a smaller quantity of bits used for indication, two uplink sTTIs are grouped into one group.

According to a rule 2, to-be-grouped downlink sTTIs are determined and downlink sTTI grouping is performed. Therefore, downlink sTTIs corresponding to the first portion of uplink sTTI groups are in a range of 0 to 22; downlink sTTIs corresponding to the second portion of uplink sTTI groups are in a range of 42 to 48; downlink sTTIs corresponding to the third portion of uplink sTTI groups are in a range of 56 to 62; downlink sTTIs corresponding to the fourth portion of uplink sTTI groups are in a range of 70 to 92; downlink sTTIs corresponding to the fifth portion of uplink sTTI groups are in a range of 112 to 118; and downlink sTTIs corresponding to the sixth portion of uplink sTTI groups are in a range of 126 to 132.

Thereafter, the downlink sTTIs are grouped and paired based on a quantity of uplink sTTI groups.

The first portion:

sTTIs 0 and 1 are grouped into one group, corresponding to sTTIs 24 and 25;

sTTIs 2 and 3 are grouped into one group, corresponding to sTTIs 26 and 27;

sTTIs 4 and 5 are grouped into one group, corresponding to sTTIs 28 and 29;

sTTIs 6 and 7 are grouped into one group, corresponding to sTTIs 30 and 31;

sTTIs 8, 9, and 10 are grouped into one group, corresponding to sTTIs 32 and 33;

sTTIs 11, 12, and 13 are grouped into one group, corresponding to sTTIs 34 and 35;

sTTIs 14, 15, and 16 are grouped into one group, corresponding to sTTIs 36 and 37;

sTTIs 17, 18, and 19 are grouped into one group, corresponding to sTTIs 38 and 39;

sTTIs 20, 21, and 22 are grouped into one group, corresponding to sTTIs 40 and 41.

The second portion:

TTIs 42 and 43 are grouped into one group, corresponding to sTTIs 50 and 51;

sTTIs 44 and 45 are grouped into one group, corresponding to sTTIs 52 and 53;

sTTIs 46, 47, and 48 are grouped into one group, corresponding to sTTIs 54 and 55.

The third portion:

TTIs 56 and 57 are grouped into one group, corresponding to sTTIs 64 and 65;

sTTIs 58 and 59 are grouped into one group, corresponding to sTTIs 66 and 67;

sTTIs 60, 61, and 62 are grouped into one group, corresponding to sTTIs 68 and 69.

The fourth portion:

sTTIs 71 and 72 are grouped into one group, corresponding to sTTIs 94 and 95;

sTTIs 72 and 73 are grouped into one group, corresponding to sTTIs 96 and 97;

sTTIs 74 and 75 are grouped into one group, corresponding to sTTIs 98 and 99;

sTTIs 76 and 77 are grouped into one group, corresponding to sTTIs 100 and 101;

sTTIs 78, 79, and 80 are grouped into one group, corresponding to sTTIs 102 and 103;

sTTIs 81, 82, and 83 are grouped into one group, corresponding to sTTIs 104 and 105;

sTTIs 84, 85, and 86 are grouped into one group, corresponding to sTTIs 106 and 107;

sTTIs 87, 88, and 89 are grouped into one group, corresponding to sTTIs 108 and 109;

sTTIs 90, 91, and 92 are grouped into one group, corresponding to sTTIs 110 and 111.

The fifth portion:

TTIs 112 and 113 are grouped into one group, corresponding to sTTIs 120 and 121;

sTTIs 114 and 115 are grouped into one group, corresponding to sTTIs 122 and 123;

sTTIs 116, 117 and 118 are grouped into one group, corresponding to sTTIs 124 and 125.

The sixth portion:

TTIs 126 and 127 are grouped into one group, corresponding to sTTIs 134 and 135;

sTTIs 128 and 129 are grouped into one group, corresponding to sTTIs 136 and 137;

sTTIs 130, 131, and 132 are grouped into one group, corresponding to sTTIs 138 and 139.

In addition, an eNB adds 1-bit information to existing DCI (regardless of whether for uplink data scheduling or downlink data scheduling) to indicate a sTTI in an uplink sTTI group. For one uplink sTTI group including two sTTIs, for example, an uplink group including sTTIs 24 and 25, the eNB configures the bit such that setting the bit indicates the sTTI 24 and resetting the bit indicates the sTTI 25, or vice versa.

After receiving an uplink data scheduling instruction, if an uplink sTTI group corresponding to a current downlink sTTI includes two sTTIs, UE retrieves the new bit and determines in which sTTI in the sTTI group the UE is to perform uplink data transmission.

After receiving a downlink data scheduling instruction, if an uplink sTTI group corresponding to a current downlink sTTI includes two sTTIs, the UE retrieves the new bit and determines in which sTTI in the sTTI group the UE is to send feedback data.

(2) 2-Symbol sTTIs

Figure 10:
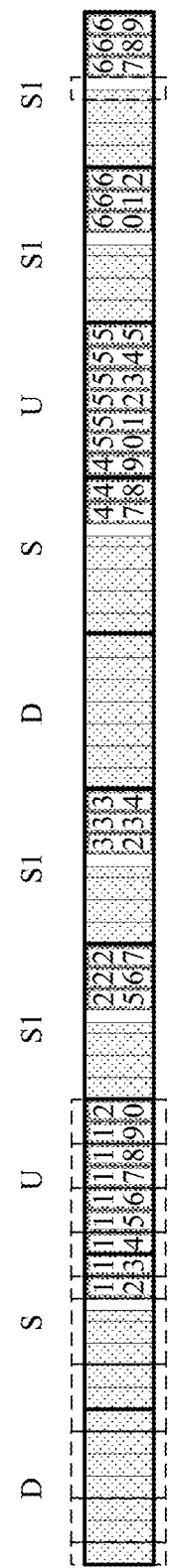
FIG. 10 shows grouping for a radio frame structure 2 with 2-symbol sTTIs.

FIG. 10 shows grouping for the radio frame structure 2 with 2-symbol sTTIs, where one radio frame includes 70 sTTIs.

As shown in FIG. 10, in a complete radio frame, there are six relatively long blocks of consecutive uplink sTTIs. According to a rule 1, to-be-grouped uplink sTTIs are determined and uplink sTTI grouping is performed. Sequence numbers of the to-be-grouped include six portions: a first portion includes uplink sTTIs 12 to 20, a second portion includes uplink sTTIs 25 to 27, a third portion includes uplink sTTIs 32 to 34, a fourth portion includes uplink sTTIs 47 to 55, a fifth portion includes uplink sTTIs 60 to 62, and a sixth portion includes uplink sTTIs 67 to 69. In consideration of a smaller quantity of bits used for indication, two uplink sTTIs are grouped into one group.

According to a rule 2, to-be-grouped downlink sTTIs are determined and downlink sTTI grouping is performed. Therefore, downlink sTTIs corresponding to the first portion of uplink sTTI groups are in a range of 66, and 0 to 11; downlink sTTIs corresponding to the second portion of uplink sTTI groups are in a range of 21 to 23; downlink sTTIs corresponding to the third portion of uplink sTTI groups are in a range of 24, and 28 to 30; downlink sTTIs corresponding to the fourth portion of uplink sTTI groups are in a range of 31, and 35 to 46; downlink sTTIs corresponding to the fifth portion of uplink sTTI groups are in a range of 56 to 58; and downlink sTTIs corresponding to the sixth portion of uplink sTTI groups are in a range of 59, and 63 to 65.

Thereafter, the downlink sTTIs are grouped and paired based on a quantity of uplink sTTI groups.

The first portion:

sTTIs 66 and 0 are grouped into one group, corresponding to a sTTI 12;

sTTIs 1 and 2 are grouped into one group, corresponding to sTTIs 13 and 14;

sTTIs 3, 4, and 5 are grouped into one group, corresponding to sTTIs 15 and 16;

sTTIs 6, 7, and 8 are grouped into one group, corresponding to sTTIs 17 and 18;

sTTIs 9, 10, and 11 are grouped into one group, corresponding to sTTIs 19 and 20.

The second portion:

a sTTI 21 is grouped into one group, corresponding to a sTTI 25;

sTTIs 22 and 23 are grouped into one group, corresponding to sTTIs 26 and 27.

The third portion:

sTTIs 24 and 28 are grouped into one group, corresponding to a sTTI 32;

TTIs 29 and 30 are grouped into one group, corresponding to sTTIs 33 and 34.

The fourth portion:

sTTIs 31 and 35 are grouped into one group, corresponding to a sTTI 47;

sTTIs 36 and 37 are grouped into one group, corresponding to sTTIs 48 and 49;

sTTIs 38, 39, and 40 are grouped into one group, corresponding to sTTIs 50 and 51;

sTTIs 41, 42, and 43 are grouped into one group, corresponding to sTTIs 52 and 53;

sTTIs 44, 45, and 46 are grouped into one group, corresponding to sTTIs 54 and 55.

The fifth portion:

a sTTI 56 is grouped into one group, corresponding to a sTTI 60;

sTTIs 57 and 58 are grouped into one group, corresponding to sTTIs 61 and 62.

The sixth portion:

sTTIs 59 and 63 are grouped into one group, corresponding to a sTTI 67;

TTIs 64 and 65 are grouped into one group, corresponding to sTTIs 68 and 69.

In addition, an eNB adds 1-bit information to existing DCI (regardless of whether for uplink data scheduling or downlink data scheduling) to indicate a sTTI in an uplink sTTI group. For one uplink sTTI group including two sTTIs, for example, an uplink group including sTTIs 13 and 14, the eNB configures the bit such that setting the bit indicates the sTTI 13 and resetting the bit indicates the sTTI 14, or vice versa.

After receiving an uplink data scheduling instruction, if an uplink sTTI group corresponding to a current downlink sTTI includes two sTTIs, UE retrieves the new bit and determines in which sTTI in the sTTI group the UE is to perform uplink data transmission.

After receiving a downlink data scheduling instruction, if an uplink sTTI group corresponding to a current downlink sTTI includes two sTTIs, the UE retrieves the new bit and determines in which sTTI in the sTTI group the UE is to send feedback data.

(3) 3/4-Symbol sTTIs

Figure 11:
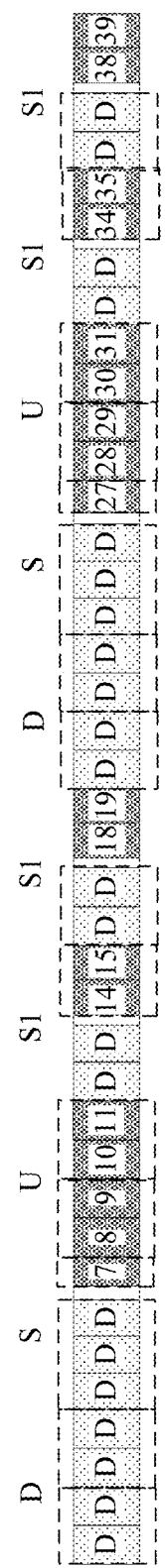
FIG. 11 shows grouping for a radio frame structure 2 with 3/4-symbol sTTIs.

FIG. 11 shows grouping for the radio frame structure 2 with 3/4-symbol sTTIs, where one radio frame includes 40 sTTIs.

As shown in FIG. 11, in a complete radio frame, there are six relatively long blocks of consecutive uplink sTTIs. According to a rule 1, to-be-grouped uplink sTTIs are determined and uplink sTTI grouping is performed. Sequence numbers of the to-be-grouped include six portions: a first portion includes uplink sTTIs 7 to 11, a second portion includes uplink sTTIs 14 to 15, a third portion includes uplink sTTIs 18 to 19, a fourth portion includes uplink sTTIs 27 to 31, a fifth portion includes uplink sTTIs 34 to 35, and a sixth portion includes uplink sTTIs 38 to 39. In consideration of a smaller quantity of bits used for indication, two uplink sTTIs are grouped into one group.

According to a rule 2, to-be-grouped downlink sTTIs are determined and downlink sTTI grouping is performed. Therefore, downlink sTTIs corresponding to the first portion of uplink sTTI groups are in a range of 36 to 37 and 0 to 3; downlink sTTIs corresponding to the second portion of uplink sTTI groups are in a range of 4 to 6; downlink sTTIs corresponding to the third portion of uplink sTTI groups are in a range of 12 to 13; downlink sTTIs corresponding to the fourth portion of uplink sTTI groups are in a range of 16 to 17 and 20 to 23; downlink sTTIs corresponding to the fifth portion of uplink sTTI groups are in a range of 24 to 26; and downlink sTTIs corresponding to the sixth portion of uplink sTTI groups are in a range of 32 to 33.

Thereafter, the downlink sTTIs are grouped and paired based on a quantity of uplink sTTI groups.

The first portion:

sTTIs 36 and 37 are grouped into one group, corresponding to a sTTI 7;

sTTIs 0 and 1 are grouped into one group, corresponding to sTTIs 8 and 9;

sTTIs 2 and 3 are grouped into one group, corresponding to sTTIs 10 and 11.

The second portion:

sTTIs 4, 5, and 6 are grouped into one group, corresponding to sTTIs 14 and 15.

The third portion:

sTTIs 12 and 13 are grouped into one group, corresponding to sTTIs 18 and 19.

The fourth portion:

sTTIs 16 and 17 are grouped into one group, corresponding to a sTTI 27;

sTTIs 20 and 21 are grouped into one group, corresponding to sTTIs 28 and 29;

sTTIs 22 and 23 are grouped into one group, corresponding to sTTIs 30 and 31.

The fifth portion:

sTTIs 24, 25, and 26 are grouped into one group, corresponding to sTTIs 34 and 35.

The sixth portion:

sTTIs 32 and 33 are grouped into one group, corresponding to sTTIs 38 and 39.

In addition, an eNB adds 1-bit information to existing DCI (regardless of whether for uplink data scheduling or downlink data scheduling) to indicate a sTTI in an uplink sTTI group. For one uplink sTTI group including two sTTIs, for example, an uplink group including sTTIs 8 and 9, the eNB configures the bit such that setting the bit indicates the sTTI 8 and resetting the bit indicates the sTTI 9, or vice versa.

After receiving an uplink data scheduling instruction, if an uplink sTTI group corresponding to a current downlink sTTI includes two sTTIs, UE retrieves the new bit and determines in which sTTI in the sTTI group the UE is to perform uplink data transmission.

After receiving a downlink data scheduling instruction, if an uplink sTTI group corresponding to a current downlink sTTI includes two sTTIs, the UE retrieves the new bit and determines in which sTTI in the sTTI group the UE is to send feedback data.

(4) 7-Symbol sTTIs

Figure 12:
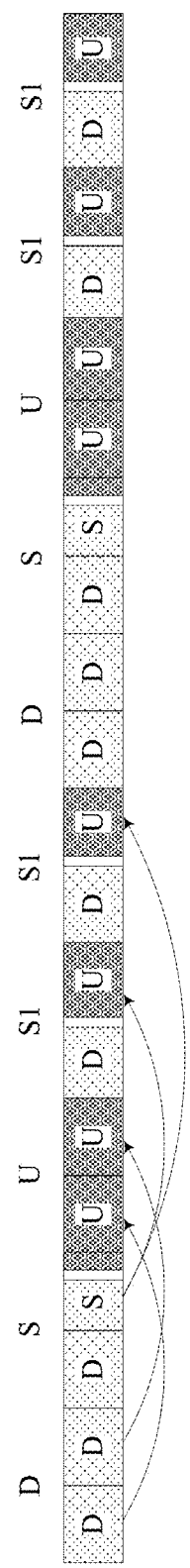
FIG. 12 shows grouping for a radio frame structure 2 with 7-symbol sTTIs.

FIG. 12 shows grouping for the radio frame structure 2 with 7-symbol sTTIs, where one radio frame includes 20 sTTIs.

For 7-symbol sTTIs, grouping is no longer performed on uplink or downlink sTTIs.

For uplink data scheduling and downlink data scheduling, a downlink sTTI is corresponding to a first uplink sTTI that is at an interval of four or more sTTIs from the downlink sTTI, and timing for uplink data scheduling and downlink data feedback is so determined. For example, if an uplink data scheduling instruction is sent in a downlink sTTI with a sequence number 0, uplink data may be sent in an uplink sTTI with a sequence number 4; if a downlink data scheduling instruction is sent in a downlink sTTI with a sequence number 1, feedback data may be sent in an uplink sTTI with a sequence number 5; and if an uplink data scheduling instruction is sent in a sTTI with a sequence number 3, uplink data may be sent in an uplink sTTI with a sequence number 9.

According to the timing method for time division communication provided in this embodiment of the present invention, it is determined, by determining whether grouping needs to be performed on uplink/downlink short transmission time intervals, for different grouping requirements, whether addition of indication information to control signaling is required to indicate to user equipment an uplink short transmission time interval sequence number in an uplink short transmission time interval group for uplink data transmission or feedback to downlink data scheduling. Alternatively, addition of indication information to control signaling is not required, and uplink data transmission or feedback to downlink data scheduling is performed in an uplink short transmission time interval determined according to a default rule. In this way, uplink scheduling timing and/or downlink feedback timing for any downlink sTTI in which uplink/downlink data scheduling is performed can meet a timing requirement after a TDD new frame structure is combined with short transmission time intervals.

Figure 13:
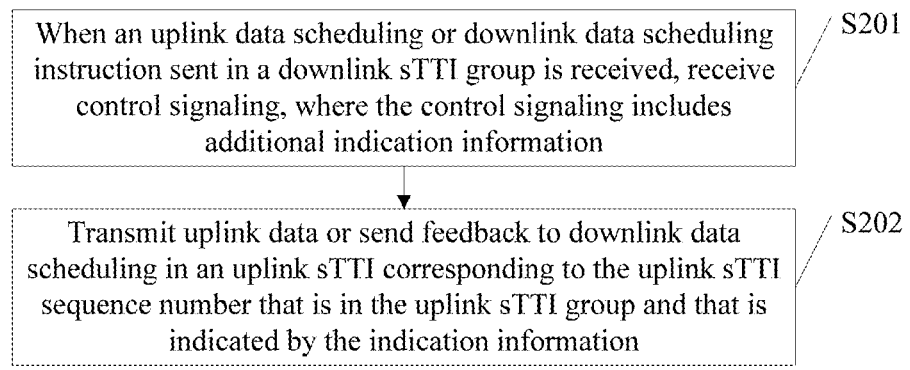
FIG. 13 shows a flowchart of an uplink/downlink data scheduling method according to an embodiment of the present invention.

FIG. 13 shows a flowchart of an uplink/downlink data scheduling method according to an embodiment of the present invention. The method includes the following steps.

S201: When an uplink data scheduling or downlink data scheduling instruction sent in a downlink sTTI group is received, receive control signaling, where the control signaling includes additional indication information, the indication information is used to indicate an uplink sTTI sequence number in an uplink sTTI group for uplink data transmission or feedback to downlink data scheduling, and the uplink sTTI group is corresponding to the downlink sTTI group.

When a base station performs uplink data scheduling or downlink data scheduling for user equipment in one or more downlink sTTIs in a downlink sTTI group, the base station adds indication information to control signaling, which may be specifically adding 1-bit information to downlink control information, and sends the control signaling to the user equipment, where the indication information is used to indicate an uplink sTTI sequence number in an uplink sTTI group for uplink data transmission or feedback to downlink data scheduling, and the uplink sTTI group is corresponding to the downlink sTTI group for uplink data scheduling or downlink data scheduling.

Specifically, if the base station has performed grouping on the uplink sTTIs and the downlink sTTIs, the indication information is used to indicate an uplink sTTI sequence number in an uplink sTTI group for uplink data transmission or feedback to downlink data scheduling; and if the base station performs grouping only on the uplink sTTIs, the indication information is used to indicate an uplink sTTI sequence number in an uplink sTTI group for uplink data transmission.

S202: Transmit uplink data or send feedback to downlink data scheduling in an uplink sTTI corresponding to the uplink sTTI sequence number that is in the uplink sTTI group and that is indicated by the indication information.

After receiving the control signaling, the user equipment transmits uplink data or sends feedback to downlink data scheduling in the uplink sTTI corresponding to the uplink sTTI sequence number that is in the uplink sTTI group and that is indicated by the indication information. In this way, uplink scheduling timing and/or downlink feedback timing for any downlink sTTI in which uplink/downlink data scheduling is performed can meet a timing requirement after a TDD new frame structure is combined with short transmission time intervals.

According to the uplink/downlink data scheduling method according to this embodiment of the present invention, the base station has added the indication information to the control signaling to indicate to the user equipment the uplink short transmission time interval sequence number in the uplink short transmission time interval group for uplink data transmission or feedback to downlink data scheduling. Therefore, uplink scheduling timing and/or downlink feedback timing for any downlink sTTI in which uplink/downlink data scheduling is performed can meet a timing requirement after a TDD new frame structure is combined with short transmission time intervals.

It should be noted that, for brief description, the foregoing method embodiments are described as series of actions. However, a person skilled in the art should appreciate that the present invention is not limited to the described action order, because according to the present invention, some steps may be performed in other orders or simultaneously. In addition, a person skilled in the art should also appreciate that all the embodiments described in this specification are embodiments, and the related actions and modules are not necessarily mandatory to the present invention.

Figure 14:
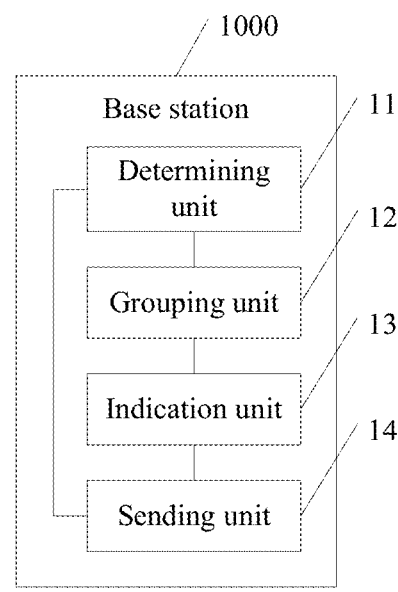
FIG. 14 shows a structure of a base station according to an embodiment of the present invention.

FIG. 14 shows a structure of a base station according to an embodiment of the present invention. The base station 1000 includes the following units.

A determining unit 11 is configured to determine, for a given radio frame structure, whether grouping needs to be performed on uplink short transmission time intervals sTTIs and/or downlink sTTIs.

The given radio frame structure herein refers to the two radio frame structures in the new special subframe type 1 shown in FIG. 3. In the first radio frame structure in FIG. 3, in the radio frame structure 1, a subframe S includes nine downlink symbols, one GP, and four uplink symbols, and a subframe S1 includes 11 downlink symbols, one GP, and two uplink symbols. In the second radio frame structure in FIG. 3, in the radio frame structure 2, a subframe S includes nine downlink symbols, one GP, and four uplink symbols, and a subframe S1 includes seven downlink symbols, one GP, and six uplink symbols.

In this embodiment, uplink scheduling timing and downlink feedback timing are designed on a per short transmission time interval basis. In other words, a short transmission time interval is defined herein as a minimum scheduling unit in time domain.

One radio frame includes a plurality of uplink/downlink sTTIs. Whether grouping needs to be performed on uplink sTTIs and/or downlink sTTIs is considered based on a difference in the two radio frame structures and different uplink/downlink symbols included in a sTTI, so as to implement timing design for a mechanism combining a TDD new frame structure and sTTIs.

Specifically, the determining unit 11 is specifically configured to: for the given radio frame structure, if a sTTI includes one symbol, two symbols, or three or four symbols, determine that grouping needs to be performed on the uplink sTTIs and the downlink sTTIs;

for the first radio frame structure, if a sTTI includes seven symbols, determine that grouping needs to be performed only on the uplink sTTIs; and for the second radio frame structure, if a sTTI includes seven symbols, determine that grouping does not need to be performed on the uplink sTTIs or the downlink sTTIs.

A grouping unit 12 is configured to, when grouping needs to be performed on the uplink sTTIs and the downlink sTTIs, group and pair the uplink sTTIs and the downlink sTTIs.

An indication unit 13 is configured to add first indication information to control signaling, where the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling.

A sending unit 14 is configured to send the control signaling to user equipment.

For the given radio frame structure, if a sTTI includes one symbol, two symbols, or three or four symbols, it is determined that grouping needs to be performed on the uplink sTTIs and the downlink sTTIs.

Figure 15:
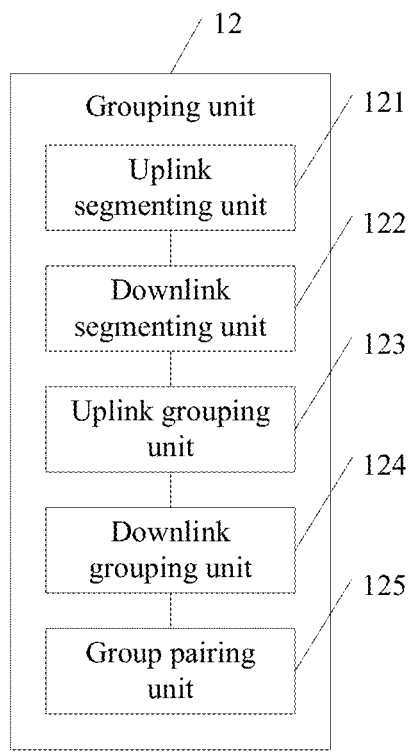
FIG. 15 shows a structure of a grouping unit in FIG. 14.

FIG. 15 shows a further refined structure of the grouping unit in FIG. 14. The grouping unit 12 includes:

an uplink segmenting unit 121, configured to group consecutive uplink sTTIs whose quantity is a in a radio frame into one segment, to obtain at least one uplink sTTI segment, where a is a positive integer greater than or equal to 2;

a downlink segmenting unit 122, configured to, for each uplink sTTI segment, determine a downlink sTTI segment corresponding to the uplink sTTI segment, where a sequence number of a start sTTI in the downlink sTTI segment is m−k+1, and a sequence number of an end sTTI in the downlink sTTI segment is n−k, where m is a sequence number of a previous uplink sTTI of the uplink sTTI segment, n is a sequence number of a last uplink sTTI in the uplink sTTI segment, and k is a preset minimum scheduling gap;

an uplink grouping unit 123, configured to divide each uplink sTTI segment into at least one uplink sTTI group;

a downlink grouping unit 124, configured to divide the downlink sTTI segment corresponding to the uplink sTTI segment into at least one downlink sTTI group; and a group pairing unit 125, configured to pair the at least one downlink sTTI group with the at least one uplink sTTI group.

During grouping, in a particular case, if a sTTI with the sequence number m−k+1 is an uplink sTTI, the start sTTI in the downlink sTTI segment is a first downlink sTTI after a sequence number m−k; and/or if the quantity a for the uplink sTTI segment is greater than k, the sequence number of the end sTTI in the downlink sTTI segment is n−a.

After grouping and pairing of the uplink sTTIs and the downlink sTTIs are completed, when uplink data scheduling or downlink data scheduling is performed for user equipment in one or more downlink sTTIs in a downlink sTTI group, a base station adds one piece of first indication information to control signaling, which may be specifically adding 1-bit information to downlink control information, and sends the control signaling to the user equipment, where the first indication information is used to indicate an uplink sTTI sequence number in an uplink sTTI group for uplink data transmission or feedback to downlink data scheduling, and the uplink sTTI group is corresponding to the downlink sTTI group for uplink data scheduling or downlink data scheduling. After receiving the control signaling, the user equipment transmits uplink data or sends feedback to downlink data scheduling in an uplink sTTI corresponding to the uplink sTTI sequence number that is in the uplink sTTI group and that is indicated by the indication information.

The first indication information is one bit. For example, for one uplink sTTI group including two sTTIs, to indicate an uplink group including sTTIs 13 and 14, an eNB configures the bit so that a set bit indicates the sTTI 13, and a reset bit indicates the sTTI 14, or vice versa.

The grouping unit 12 is further configured to, when grouping needs to be performed only on the uplink sTTIs, group the uplink sTTIs into one group, where during uplink data scheduling, all downlink sTTIs that are at an interval of k or more sTTIs from the uplink sTTIs in the uplink sTTI group are usable for sending uplink data scheduling instructions, and k is a preset minimum scheduling gap.

The indication unit 13 is further configured to add second indication information to the control signaling, where the second indication information is used to indicate an uplink sTTI sequence number in an uplink sTTI group for uplink data transmission.

For a given first radio frame structure, if a sTTI includes seven symbols, it is determined that grouping needs to be performed only on the uplink sTTIs, that is, grouping is no longer performed on the downlink sTTIs. During uplink data scheduling, all downlink sTTIs that are at an interval of k or more sTTIs from the uplink sTTIs in the uplink sTTI group are usable for sending uplink data scheduling instructions, where k is a preset minimum scheduling gap, and a preferable value range of k is 1 to 4. Second indication information is added to the control signaling, where the second indication information is used to indicate an uplink sTTI sequence number in an uplink sTTI group for uplink data transmission. The second indication information is one bit. During uplink data scheduling, an uplink sTTI for uplink data transmission cannot include a downlink symbol or a GP.

For downlink data scheduling, a downlink sTTI is corresponding to a first uplink sTTI that is at an interval of k or more sTTIs from the downlink sTTI, and timing for downlink data feedback is so determined. During downlink data scheduling, an uplink sTTI for downlink data feedback may include a downlink symbol or a GP.

The indication unit 13 is further configured to, when grouping does not need to be performed on the uplink sTTIs or the downlink sTTIs, instruct to transmit uplink data or send feedback to downlink data scheduling in a first uplink sTTI that is at an interval of k or more sTTIs from a downlink sTTI in which an uplink or downlink data scheduling instruction is sent.

For a given second radio frame structure, if a sTTI includes seven symbols, it is determined that grouping does not need to be performed on the uplink sTTIs or the downlink sTTIs. A timing design is that uplink data transmission or feedback to downlink data scheduling is performed in the first uplink sTTI that is at an interval of k or more sTTIs from the downlink sTTI in which an uplink or downlink data scheduling instruction is sent.

By determining whether grouping needs to be performed on uplink/downlink short transmission time intervals, the base station provided in this embodiment of the present invention determines, for different grouping requirements, whether addition of indication information to control signaling is required to indicate to user equipment an uplink short transmission time interval sequence number in an uplink short transmission time interval group for uplink data transmission or feedback to downlink data scheduling. Alternatively, addition of indication information to control signaling is not required, and uplink data transmission or feedback to downlink data scheduling is performed in an uplink short transmission time interval determined according to a default rule. In this way, uplink scheduling timing and/or downlink feedback timing for any downlink sTTI in which uplink/downlink data scheduling is performed can meet a timing requirement after a TDD new frame structure is combined with short transmission time intervals.

Figure 16:
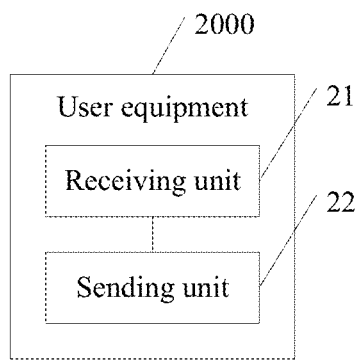
FIG. 16 shows a structure of user equipment according to an embodiment of the present invention.

FIG. 16 shows a structure of user equipment according to an embodiment of the present invention. The user equipment 2000 includes the following units.

A receiving unit 21 is configured to receive control signaling when an uplink data scheduling or downlink data scheduling instruction sent in a downlink sTTI group is received, where the control signaling includes additional indication information, the indication information is used to indicate an uplink sTTI sequence number in an uplink sTTI group for uplink data transmission or feedback to downlink data scheduling, and the uplink sTTI group is corresponding to the downlink sTTI group.

When a base station performs uplink data scheduling or downlink data scheduling for the user equipment in one or more downlink sTTIs in a downlink sTTI group, the base station adds indication information to control signaling, which may be specifically adding 1-bit information to downlink control information, and sends the control signaling to the user equipment, where the indication information is used to indicate an uplink sTTI sequence number in an uplink sTTI group for uplink data transmission or feedback to downlink data scheduling, and the uplink sTTI group is corresponding to the downlink sTTI group for uplink data scheduling or downlink data scheduling.

Specifically, if the base station has performed grouping on the uplink sTTIs and the downlink sTTIs, the indication information is used to indicate an uplink sTTI sequence number in an uplink sTTI group for uplink data transmission or feedback to downlink data scheduling; and if the base station performs grouping only on the uplink sTTIs, the indication information is used to indicate an uplink sTTI sequence number in an uplink sTTI group for uplink data transmission.

A sending unit 22 is configured to transmit uplink data or send feedback to downlink data scheduling in an uplink sTTI corresponding to the uplink sTTI sequence number that is in the uplink sTTI group and that is indicated by the indication information.

After receiving the control signaling, the user equipment transmits uplink data or sends feedback to downlink data scheduling in the uplink sTTI corresponding to the uplink sTTI sequence number that is in the uplink sTTI group and that is indicated by the indication information. In this way, uplink scheduling timing and/or downlink feedback timing for any downlink sTTI in which uplink/downlink data scheduling is performed can meet a timing requirement after a TDD new frame structure is combined with short transmission time intervals.

For the user equipment provided in this embodiment of the present invention, the base station has added the indication information to the control signaling to indicate to the user equipment the uplink short transmission time interval sequence number in the uplink short transmission time interval group for uplink data transmission or feedback to downlink data scheduling. Therefore, uplink scheduling timing and/or downlink feedback timing for any downlink sTTI in which uplink/downlink data scheduling is performed can meet a timing requirement after a TDD new frame structure is combined with short transmission time intervals.

Figure 17:
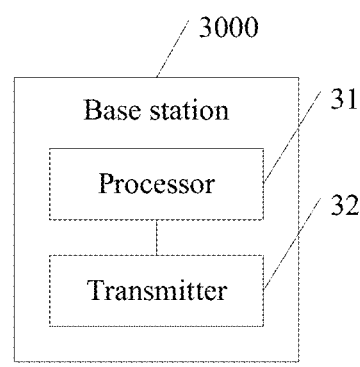
FIG. 17 shows a structure of another base station according to an embodiment of the present invention.

FIG. 17 shows a structure of another base station according to an embodiment of the present invention. The base station 3000 includes a processor 31 and a transmitter 32; where the processor 31 is configured to determine, for a given radio frame structure, whether grouping needs to be performed on uplink short transmission time intervals sTTIs and/or downlink sTTIs;

the processor 31 is further configured to, when grouping needs to be performed on the uplink sTTIs and the downlink sTTIs, group and pair the uplink sTTIs and the downlink sTTIs, add first indication information to control signaling, and send the control signaling to user equipment, where the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling;

the processor 31 is further configured to, when grouping needs to be performed only on the uplink sTTIs, grouping the uplink sTTIs into one group, where during uplink data scheduling, all downlink sTTIs that are at an interval of k or more sTTIs from the uplink sTTIs in the uplink sTTI group are usable for sending uplink data scheduling instructions, and k is a preset minimum scheduling gap; and adding second indication information to the control signaling, where the second indication information is used to indicate an uplink sTTI sequence number in an uplink sTTI group for uplink data transmission;

the transmitter 32 is configured to send the control signaling to user equipment; and the processor 31 is further configured to, when grouping does not need to be performed on the uplink sTTIs or the downlink sTTIs, instruct to transmit uplink data or send feedback to downlink data scheduling in a first uplink sTTI that is at an interval of k or more sTTIs from a downlink sTTI in which an uplink or downlink data scheduling instruction is sent.

In a possible implementation, the processor 31 is specifically configured to:

for the given radio frame structure, if a sTTI includes one symbol, two symbols, or three or four symbols, determine that grouping needs to be performed on the uplink sTTIs and the downlink sTTIs;

for a first radio frame structure, if a sTTI includes seven symbols, determine that grouping needs to be performed only on the uplink sTTIs; and for a second radio frame structure, if a sTTI includes seven symbols, determine that grouping does not need to be performed on the uplink sTTIs or the downlink sTTIs; where the given radio frame structure includes the first radio frame structure and the second radio frame structure.

In another possible implementation, the processor 31 is specifically configured to:

group consecutive uplink sTTIs whose quantity is a in a radio frame into one segment, to obtain at least one uplink sTTI segment, where a is a positive integer greater than or equal to 2;

for each uplink sTTI segment, determine a downlink sTTI segment corresponding to the uplink sTTI segment, where a sequence number of a start sTTI in the downlink sTTI segment is m−k+1, and a sequence number of an end sTTI in the downlink sTTI segment is n−k, where m is a sequence number of a previous uplink sTTI of the uplink sTTI segment, n is a sequence number of a last uplink sTTI in the uplink sTTI segment, and k is a preset minimum scheduling gap;

divide each uplink sTTI segment into at least one uplink sTTI group; and divide the downlink sTTI segment corresponding to the uplink sTTI segment into at least one downlink sTTI group, and pair the at least one downlink sTTI group with the at least one uplink sTTI group.

In further another possible implementation, if a sTTI with the sequence number m−k+1 is an uplink sTTI, the start sTTI in the downlink sTTI segment is a first downlink sTTI after a sequence number m−k; and/or if the quantity a for the uplink sTTI segment is greater than k, the sequence number of the end sTTI in the downlink sTTI segment is n−a.

In still another possible implementation, the first indication information or the second indication information is one bit.

By determining whether grouping needs to be performed on uplink/downlink short transmission time intervals, the base station provided in this embodiment of the present invention determines, for different grouping requirements, whether addition of indication information to control signaling is required to indicate to user equipment an uplink short transmission time interval sequence number in an uplink short transmission time interval group for uplink data transmission or feedback to downlink data scheduling. Alternatively, addition of indication information to control signaling is not required, and uplink data transmission or feedback to downlink data scheduling is performed in an uplink short transmission time interval determined according to a default rule. In this way, uplink scheduling timing and/or downlink feedback timing for any downlink sTTI in which uplink/downlink data scheduling is performed can meet a timing requirement after a TDD new frame structure is combined with short transmission time intervals.

Figure 18:
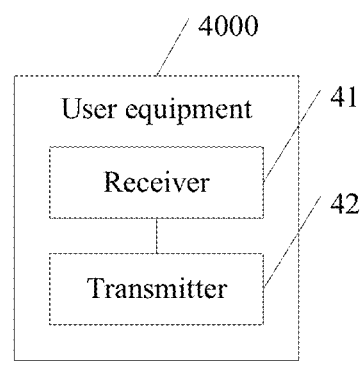
FIG. 18 shows a structure of another user equipment according to an embodiment of the present invention.

FIG. 18 shows a structure of another user equipment according to an embodiment of the present invention. The user equipment 4000 includes a receiver 41 and a transmitter 42; where the receiver 41 is configured to receive control signaling when an uplink data scheduling or downlink data scheduling instruction sent in a downlink sTTI group is received, where the control signaling includes additional indication information, the indication information is used to indicate an uplink sTTI sequence number in an uplink sTTI group for uplink data transmission or feedback to downlink data scheduling, and the uplink sTTI group is corresponding to the downlink sTTI group; and the transmitter 42 is configured to transmit uplink data or send feedback to downlink data scheduling in an uplink sTTI corresponding to the uplink sTTI sequence number that is in the uplink sTTI group and that is indicated by the indication information.

For the user equipment provided in this embodiment of the present invention, a base station has added the indication information to the control signaling to indicate to the user equipment the uplink short transmission time interval sequence number in the uplink short transmission time interval group for uplink data transmission or feedback to downlink data scheduling. Therefore, uplink scheduling timing and/or downlink feedback timing for any downlink sTTI in which uplink/downlink data scheduling is performed can meet a timing requirement after a TDD new frame structure is combined with short transmission time intervals.

In the foregoing embodiments, the descriptions of the embodiments have respective focuses. For a part that is not described in detail in one embodiment, refer to related descriptions in other embodiments.

Based on actual needs, an order of the steps of the method in the embodiments of the present invention may be adjusted, or some steps may be merged or removed.

The units of the apparatus in the embodiments of the present invention may be merged, divided, or removed based on actual needs. A person skilled in the art may integrate or combine different embodiments or characteristics of different embodiments described in this specification.

With descriptions of the foregoing embodiments, a person skilled in the art can clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that facilitates transmission of a computer program from one place to another. The storage medium may be any available medium accessible by a computer. For example but not limitation, the computer readable medium may include a random access memory (RAM), a read-only memory (ROM), an electrically erasable programmable read-only memory (EEPROM), a compact disc read-only memory (CD-ROM) or other optical disc storages, a disk storage medium or other disk storages, or any other medium that can be used to carry or store expected program code in a command or data structure form and can be accessed by a computer. In addition, any connection may become a computer-readable medium when appropriate. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in the definition of the medium. For example, a disk or disc used in the present invention includes a compact disc (CD), a laser disc, an optical disc, a digital versatile disc (DVD), a floppy disk and a Blu-ray disc, where the disk generally copies data magnetically, and the disc copies data optically by using laser. Combinations of the foregoing should also be included in the protection scope of the computer-readable medium.

In conclusion, what are described above are merely example embodiments of the technical solutions of the present invention, and are not intended to limit the protection scope of the present invention. Any modification, equivalent replacement, or improvement made without departing from the spirit and principle of the present invention shall fall within the protection scope of the present invention.

What is claimed is:

1. A timing method for time division duplex communication, wherein the method comprises:
   determining, for a given radio frame structure, whether grouping needs to be performed on uplink short transmission time intervals (sTTIs) and/or downlink sTTIs; and
   when grouping needs to be performed on the uplink sTTIs and the downlink sTTIs, grouping and pairing the uplink sTTIs and the downlink sTTIs, adding first indication information to control signaling, and sending the control signaling to user equipment, wherein the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling;
   when grouping needs to be performed only on the uplink sTTIs, grouping the uplink sTTIs into one group, wherein during uplink data scheduling, all downlink sTTIs that are at an interval of (k) or more sTTIs from the uplink sTTIs in the uplink sTTI group are usable for sending uplink data scheduling instructions, and (k) is a preset minimum scheduling gap and (k) is an integer greater than zero; and adding second indication information to control signaling, wherein the second indication information is used to indicate an uplink sTTI sequence number in an uplink sTTI group for uplink data transmission; or when grouping does not need to be performed on the uplink sTTIs or the downlink sTTIs, instructing to transmit uplink data or send feedback to downlink data scheduling in a first uplink sTTI that is at an interval of (k) or more sTTIs from a downlink sTTI in which an uplink or downlink data scheduling instruction is sent.

2. The method according to claim 1, wherein the determining, for a given radio frame structure, whether grouping needs to be performed on uplink short transmission time intervals sTTIs and/or downlink sTTIs comprises:

for the given radio frame structure, responsive to determining that a sTTI comprises one symbol, two symbols, or three or four symbols, determining that grouping needs to be performed on the uplink sTTIs and the downlink sTTIs;

for a first radio frame structure, responsive to determining that a sTTI comprises seven symbols, determining that grouping needs to be performed only on the uplink sTTIs; and for a second radio frame structure, responsive to determining that a sTTI comprises seven symbols, determining that grouping does not need to be performed on the uplink sTTIs or the downlink sTTIs; wherein the given radio frame structure comprises the first radio frame structure and the second radio frame structure.

3. The method according to claim 1, wherein the grouping and pairing the uplink sTTIs and the downlink sTTIs when grouping needs to be performed on the uplink sTTIs and the downlink sTTIs comprises:

grouping consecutive uplink sTTIs whose quantity is (a) in a radio frame into one segment, to obtain at least one uplink sTTI segment, wherein (a) is a positive integer greater than or equal to 2;

for each uplink sTTI segment, determining a downlink sTTI segment corresponding to the uplink sTTI segment, wherein a sequence number of a start sTTI in the downlink sTTI segment is (m)−(k)+1, and a sequence number of an end sTTI in the downlink sTTI segment is (n)−(k), wherein (m) is an integer sequence number of a previous uplink sTTI of the uplink sTTI segment, and (n) is an integer sequence number of a last uplink sTTI in the uplink sTTI segment;

dividing each uplink sTTI segment into at least one uplink sTTI group; and dividing the downlink sTTI segment corresponding to the uplink sTTI segment into at least one downlink sTTI group, and pairing the at least one downlink sTTI group with the at least one uplink sTTI group.

4. The method according to claim 3, wherein if a sTTI with the sequence number (m)−(k)+1 is an uplink sTTI, the start sTTI in the downlink sTTI segment is a first downlink sTTI after a sequence number (m)−(k); and/or if the quantity (a) for the uplink sTTI segment is greater than k, the sequence number of the end sTTI in the downlink sTTI segment is n a (n)−(a).

5. The method according to claim 1, wherein the first indication information or the second indication information is one bit.

6. A base station, wherein the base station comprises a processor and a transmitter;

the processor is configured to determine, for a given radio frame structure, whether grouping needs to be performed on uplink short transmission time intervals sTTIs and/or downlink sTTIs;

the processor is further configured to, when grouping needs to be performed on the uplink sTTIs and the downlink sTTIs, group and pair the uplink sTTIs and the downlink sTTIs, add first indication information to control signaling, and send the control signaling to user equipment, wherein the first indication information is used to indicate an uplink sTTI sequence number in an uplink sTTI group for uplink data transmission or feedback to downlink data scheduling, and the uplink sTTI group is corresponding to a downlink sTTI group for uplink data scheduling or downlink data scheduling;

the processor is further configured to, when grouping needs to be performed only on the uplink sTTIs, group the uplink sTTIs into one group, wherein during uplink data scheduling, all downlink sTTIs that are at an interval of (k) or more sTTIs from the uplink sTTIs in the uplink sTTI group are usable for sending uplink data scheduling instructions, and (k) is a preset minimum scheduling gap and (k) is an integer greater than zero; and add second indication information to the control signaling, wherein the second indication information is used to indicate an uplink sTTI sequence number in an uplink sTTI group for uplink data transmission;

the transmitter is configured to send the control signaling to user equipment; and the processor is further configured to, when grouping does not need to be performed on the uplink sTTIs or the downlink sTTIs, instruct to transmit uplink data or send feedback to downlink data scheduling in a first uplink sTTI that is at an interval of (k) or more sTTIs from a downlink sTTI in which an uplink or downlink data scheduling instruction is sent.

7. The base station according to claim 6, wherein the processor is configured to:

for the given radio frame structure, responsive to determining that a sTTI comprises one symbol, two symbols, or three or four symbols, determine that grouping needs to be performed on the uplink sTTIs and the downlink sTTIs;

for a first radio frame structure, responsive to determining that a sTTI comprises seven symbols, determine that grouping needs to be performed only on the uplink sTTIs; and for a second radio frame structure, responsive to determining that a sTTI comprises seven symbols, determine that grouping does not need to be performed on the uplink sTTIs or the downlink sTTIs; wherein the given radio frame structure comprises the first radio frame structure and the second radio frame structure.

8. The base station according to claim 6, wherein the processor is specifically configured to:

grouping consecutive uplink sTTIs whose quantity is a in a radio frame into one segment, to obtain at least one uplink sTTI segment, wherein (a) is a positive integer greater than or equal to 2;

for each uplink sTTI segment, determine a downlink sTTI segment corresponding to the uplink sTTI segment, wherein a sequence number of a start sTTI in the downlink sTTI segment is (m)−(k)+1, and a sequence number of an end sTTI in the downlink sTTI segment is (n)−(k), wherein (m) is a sequence integer number of a previous uplink sTTI of the uplink sTTI segment, and (n) is a sequence integer number of a last uplink sTTI in the uplink sTTI segment;

divide each uplink sTTI segment into at least one uplink sTTI group; and divide the downlink sTTI segment corresponding to the uplink sTTI segment into at least one downlink sTTI group, and pair the at least one downlink sTTI group with the at least one uplink sTTI group.

9. The base station according to claim 8, wherein if a sTTI with the sequence number (m)–(k)+1 is an uplink sTTI, the start sTTI in the downlink sTTI segment is a first downlink sTTI after a sequence number m k (m)–(k); and/or if the quantity (a) for the uplink sTTI segment is greater than (k), the sequence number of the end sTTI in the downlink sTTI segment is n a (n)–(a).

10. The base station according to claim 6, wherein the first indication information or the second indication information is one bit.

11. User equipment, wherein the user equipment comprises a receiver and a transmitter;

the receiver is configured to receive control signaling when an uplink data scheduling or downlink data scheduling instruction sent in a downlink sTTI group is received, wherein the control signaling comprises additional indication information, the indication information is used to indicate an uplink sTTI sequence number in an uplink sTTI group for uplink data transmission or feedback to downlink data scheduling, and the uplink sTTI group is corresponding to the downlink sTTI group; and the transmitter is configured to transmit uplink data or send feedback to downlink data scheduling in an uplink sTTI corresponding to the uplink sTTI sequence number that is in the uplink sTTI group and that is indicated by the indication information.

* * * * *

UNITED STATES PATENT AND TRADEMARK OFFICE
CERTIFICATE OF CORRECTION

PATENT NO. : 10,813,114 B2
APPLICATION NO. : 16/185307
DATED : October 20, 2020
INVENTOR(S) : Hao Sun, Yan Cheng and Lixia Xue Page 1 of 1

It is certified that error appears in the above-identified patent and that said Letters Patent is hereby corrected as shown below:

In the Claims

In Claim 4, Column 27, Line 58, delete "is n a (n)-(a)" and insert --is (n)-(a)--.

In Claim 9, Column 29, Line 10, delete "number m k (m)-(k)" and insert --number (m)-(k)--.

In Claim 9, Column 29, Line 13, delete "is n a (n)-(a)" and insert --is (n)-(a)--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*